United States Patent [19]

Blume et al.

[11] Patent Number: 4,623,191

[45] Date of Patent: Nov. 18, 1986

[54] ROTATING AND POSITIONING TOOL FOR AXIALLY SYMMETRICAL WORKPIECES, ESPECIALLY STEERING TIE RODS IN MOTOR VEHICLES

[75] Inventors: Harald Blume, Immenhausen; Bodo Wagner, Niestetal, both of Fed. Rep. of Germany

[73] Assignee: Wegmann & Co. GMBH, Kassel, Fed. Rep. of Germany

[21] Appl. No.: 672,564

[22] Filed: Nov. 19, 1984

[30] Foreign Application Priority Data

Mar. 24, 1984 [DE] Fed. Rep. of Germany ....... 3410912

[51] Int. Cl.[4] .............................................. B23B 31/16
[52] U.S. Cl. .................................... 279/110; 279/71;
192/79; 192/93 R; 188/75
[58] Field of Search .................. 279/33, 71, 110, 114;
192/79, 93 R; 188/75

[56] References Cited

U.S. PATENT DOCUMENTS

| | | | |
|---|---|---|---|
| 2,557,486 | 6/1951 | Weiss | 279/71 |
| 2,883,198 | 4/1959 | Narumi | 279/33 |
| 3,589,742 | 6/1971 | Flick | 279/114 |

FOREIGN PATENT DOCUMENTS

| | | | |
|---|---|---|---|
| 96242 | 10/1923 | Fed. Rep. of Germany | 279/110 |
| 2025491 | 12/1971 | Fed. Rep. of Germany | 279/114 |
| 1044505 | 11/1953 | France | 188/75 |
| 933291 | 6/1982 | U.S.S.R. | 408/124 |

Primary Examiner—Gil Weidenfield
Assistant Examiner—Daniel W. Howell
Attorney, Agent, or Firm—Sprung, Horn, Kramer & Woods

[57] ABSTRACT

Rotating and positioning tool for axially symmetrical workpieces, especially for steering tie rods in motor vehicles. A housing with a recess for the introduction of a workpiece accommodates a clamping mechanism with a crown gear that is positioned and driven at its circumference. An empty space inside the crown gear communicates with the outside through an access slot. The space is demarcated by a contour. Three tension rollers are accommodated inside the empty space in such a way that they can be displaced radially inwardly against the force of springs. The rollers roll along the contour. The distance of the contour from its axis of rotation continuously varies through alternating maxima and minima. As the crown gear rotates, the tension rollers are forced in from a starting position where the distance is maximal and securely clamp the workpiece, which is located at the axis of rotation. The workpiece W can be rotated around any desired angle by continuing to rotate the crown gear along with the tension rollers. The clamping action is released by rotating the crown gear in the opposite direction.

3 Claims, 5 Drawing Figures

ROTATING AND POSITIONING TOOL FOR AXIALLY SYMMETRICAL WORKPIECES, ESPECIALLY STEERING TIE RODS IN MOTOR VEHICLES

BACKGROUND OF THE INVENTION

1. Field of the Invention

The present invention relates to a rotating and positioning tool for axially symmetrical workpieces, especially steering tie rods in motor vehicles, with a housing that has a recess for inserting the workpiece and that accommodates a clamping mechanism that is powered, that engages the outside of the workpiece, and that can be rotated around the longitudinal axis of the workpiece.

The axially symmetrical workpieces are in particular pipes or rods with a cylindrical surface that have to be rotated around their longitudinal axis, to position them for instance, even though their ends are inaccessible. It must accordingly be possible to grasp the workpiece at any desired accessible point and to rotate it. Furthermore, it is not assumed herein that the point has been specially worked or that its structure makes it an appropriate positive grasping point.

Lack of true, cross-sectional tolerances, and surface irregularities of the type common in castings for example should not affect the positioning process in any way. The invention makes it possible to reliably secure workpieces with non-circular, elliptical or polygonal for example, cross-sections.

The connection between the workpiece and the tool must be unobjectionable in order to allow the reliable transmission of high torques.

Automatic rotation of the workpiece also necessitates a controlled drive mechanism governed by signals, generated by a measuring system for instance, in such a way that the tool can be integrated into a partly or fully automatic process, finishing for example. It must also be possible to operate the tool manually.

An especially important application of a rotating and positioning tool that will satisfy the aforesaid demands is the positioning of steering tie rods in motor vehicles.

2. Discussion of Prior Art

A rotating and positioning tool of the aforementioned type is known from German Pat. No. 2 644 865. The rotating clamping mechanism exhibits three compression rollers, at least one of them driven, that can be forced against the workpiece. The drawback of this known rotating and positioning tool is that the torques that have to be transmitted are relatively slight, even when the compression forces are strong, and are inadequate in consideration of the irregularities in the surface of the workpiece.

SUMMARY OF THE INVENTION

It is an object of the present invention to provide a rotating and positioning tool of the aforesaid type that optimally satisfies all the aforesaid demands and, in particular, reliably transmits very high torques subject to precise preliminary setting even when the surface quality of the workpiece is unsatisfactory without damaging the surface. Other objects of this invention include providing a tool which centers the workpiece itself automatically when tensioned into the tool and is suitable for workpieces with different cross-sections such that they are reliably grasped.

These and other objects of this invention are attained in accordance with the invention by a rotating and positioning tool comprising a clamping mechanism having a crown gear that, is driven at its circumference, and is rotatable in a housing, and has an empty space inside it that communicates with the outside through an access slot, said crown gear having an axis of rotation and being demarcated by a contour means that varies between a maximal and a minimal distance from said axis of rotation during one rotation of said crown gear, whereby three segments that have the same maximum are distributed around the contour at angles of 120° and three tension rollers are distributed around the inside of the crown gear at angles of 120° and roll over said contour means, said tension rollers having pivots, which are parallel to said axis of rotation of said crown gear, sliding back and forth in oblong slots in bearing disks disposed on each side of and coaxial with said crown gear whereby said bearing disks are rotated in common in a direction opposite that of said crown gear, each of which bearing disks having an entry slot extending from the outside of to said disk beyond the axis of rotation of said crown gear, said tension rollers forced radially by springs against said contour means, said tools having a releasable brake shoe positioned against at least one of said bearing disks.

The crown gear can be driven at two angularly displaced points around its circumference by a cogwheel drive mechanism (4a, 4b, and 5). The crown gear can be positioned by a peripheral ring of ball bearings on the housing.

The distance of the contour from the axis of rotation is minimal between each pair of segments where the distance is maximal and the distance continuously decreases from both maxima toward the minimum.

Each bearing disk is positioned against a ring of ball bearings (14) along the circumference of the crown gear whereby the direction of rotation of each bearing disk becomes opposite to that of the crown gear. The bearing disks are connected to each other in such a way that they cannot rotate in relation to each other by spacers (11 and 12) that extend through the inside of the crown gear.

One (10) of the bearing disks has an appendage (10b) whose circumference is engaged by a braking mechanism. A braking mechanism can be a shoe brake with two pivoting brake shoes (21) that cover the circumference of the appendage, that are compressed by a spring (24), and that can be separated by a wedge (23) on the end of a brake handle (22) which can be activated by a pneumatic cylinder (26).

The rotating and positioning tool, which will be described in detail hereinafter in terms of one embodiment, operates in accordance with the basic principle that will now be described.

Crown gear 1, accommodated in the clamping mechanism, and bearing disks 9 and 10 are adjusted such that the access slot of the crown gear and the entry slots of the bearing disks parallel the recess 3a in housing 3. In this position, the tool can be slid over a workpiece W, the steering tie rods of a motor vehicle for example. The mechanism that powers the tool is then started up and the rotation of crown gear 1 forces the tension rollers 6 inside the gear toward the center and against workpiece W, which becomes securely clamped therebetween. As the crown gear continues to rotate, it forces tension rollers 6 to rotate workpiece W around its longitudinal axis. The higher the torque that is needed to rotate the workpiece the more powerful clamping action is automatically provided. Reversing the rotation releases the clamping action which can be renewed, as desired, in the opposite direction.

BRIEF DESCRIPTION OF THE DRAWINGS

A preferred embodiment of the invention will now be described with reference to the attached drawings, wherein.

DETAILED DESCRIPTION OF SPECIFIC EMBODIMENT

Figure 1:
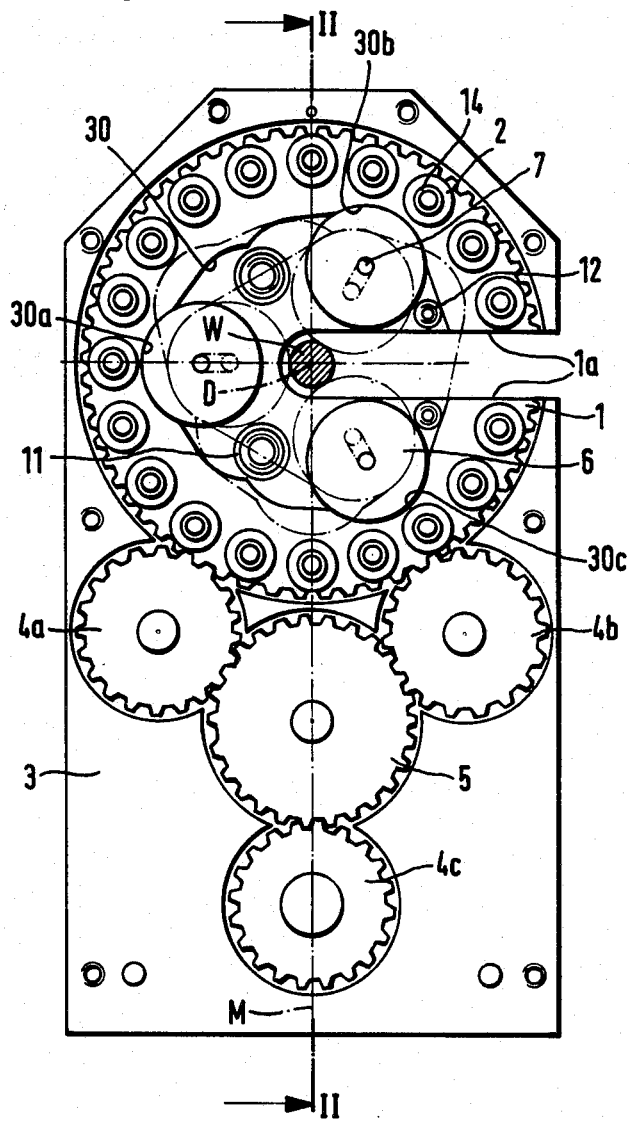
FIG. 1 illustrates the rotating and positioning tool with the housing cover removed as viewed from the position I in FIG. 2.
Figure 2:
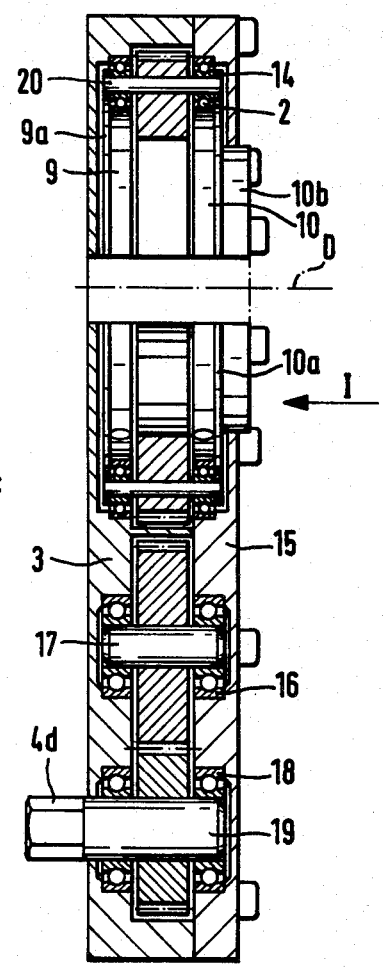
FIG. 2 is a section along the line II—II in FIG. 1.

The rotating and positioning tool illustrated in FIGS. 1 through 5 has a flat housing 3 that can be closed on one broad side with a cover 15 (FIG. 2) and has a recess 3a (FIG. 4) in one narrow side that extends from outside to beyond the center of the housing for the introduction of a workpiece W. Housing 3 accommodates a rotating crown gear 1 that has an empty space inside it. Around its axis D of rotation of crown gear 1 there is an access slot 1a that extends from outside the crown gear into the empty space thereof for the introduction of workpiece W.

Since the empty space inside it prevents crown gear 1 from being fastened at the center to a stationary shaft, the gear is mounted peripherally in housing 3. This is done by means of a ring of ball bearings 2 around and on both sides of crown gear 1. Ball bearings 2 roll along the inside surface of the recess in housing 3 that accommodates crown gear 1. Crown gear 1 is driven by two cogwheels 4a and 4b at its circumference that are driven in turn by a driving cogwheel 4c through a common cogwheel 5. Driving cogwheel 4c can be connected to a drive mechanism by a hexagon 4d (FIG. 2) in a way that is not illustrated. Cogwheels 4a and 4b are needed because crown gear 1 has access slot 1a, which would interrupt the transmission of force if it traveled by just one cogwheel. Thus one of the two cogwheels 4a and 4b is always engaging crown gear 1 in the embodiment illustrated.

The space around the axis D of rotation of crown gear 1 is demarcated by a contour 30. As will be evident from FIG. 1, contour 30 varies several times between a maximal and a minimal distance from its axis D of rotation during one rotation around the contour. Three segments 30a, 30b, and 30c of contour 30 are distributed around the contour at angles of 120°. The distance is a maximum at these segments. Between the segments the distance decreases continuously to a minimum that is located between each pair of maxima. Three tension rollers 6 are distributed around the inside of the crown gear at angles of 120°. Their pivots 7 parallel the axis D of rotation of crown gear 1 and their surfaces can roll over radially outward points on contour 30 when crown gear 1 rotates. The pivots 7 of tension rollers 6 are mounted in such a way as to slide back and forth radially as will described in detail hereinafter. Consequently, when crown gear 1 rotates, tension rollers 6 will be forced radially outward as they roll along contour 30. Commencing with the initial position, which is represented by the continuous lines in FIG. 1 and in which tension rollers 6 contact contour 30 at segments 30a through 30c and hence at the maximal possible distance from axis D of rotation, tension rollers 6 will be forced radially inward toward axis D of rotation as crown gear 1 rotates and hence toward workpiece W. Tension rollers 6 will stop rolling along contour 30 whenever all three of them are in contact with workpiece W. The operation is accordingly similar to an idling process. Commencing with the initial position illustrated in FIG. 1, tension rollers 6 will always be forced inward in either direction of rotation.

Figure 3:
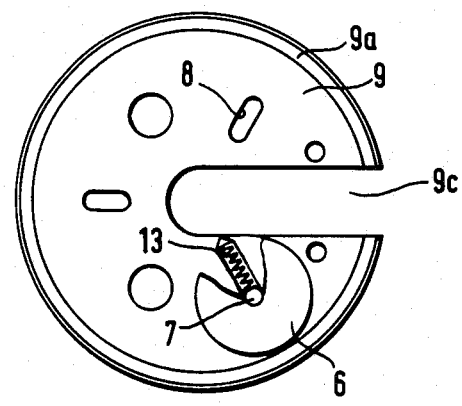
FIG. 3 is a side view of one of the bearing disks from the tool illustrated in FIGS. 1 and 2.

The inward displacement of tension rollers 6 is made possible in that their pivots 7 are mounted in such a way that they can slide back and forth in oblong slots 8 that are machined into two bearing disks 9 and 10. Bearing disk 9, which is similar to having disk 10 is illustrated in FIG. 3. Bearing disks 9 and 10 are positioned on each side of and coaxial with crown gear 1. Bearing disks 9 and 10 are rigidly connected by spacers 11 and 12 that extend through the space inside crown gear 1 and by screws 28 and 29. To allow workpiece W to be introduced, they have an entry slot 9c or 10c that extends from outside to beyond their center. Bearing disks 9 and 10 can be rotated against housing 3 and crown gear 1 around axis D of rotation. Bearing disks 9 and 10 accordingly have external appendages 9a and 10a with diameters longer than that of the disks. Ball bearings 14, which are mounted on crown gear 1 coaxially with the ball bearings 2 in the ring, roll over the circumferences of appendages 9a and 10a.

Compression springs 13 constantly force the tension-roller pivots 7 in the oblong slots 8 in bearing disks 9 and 10 (cf. FIG. 3) outward. The aforesaid rolling of tension rollers 6 along the contour 30 on crown gear 1 results from compression springs 13 forcing the rollers against the contour as the gear rotates. Bearing disks 9 and 10 are kept stationary by a braking mechanism during this movement.

Figure 4:
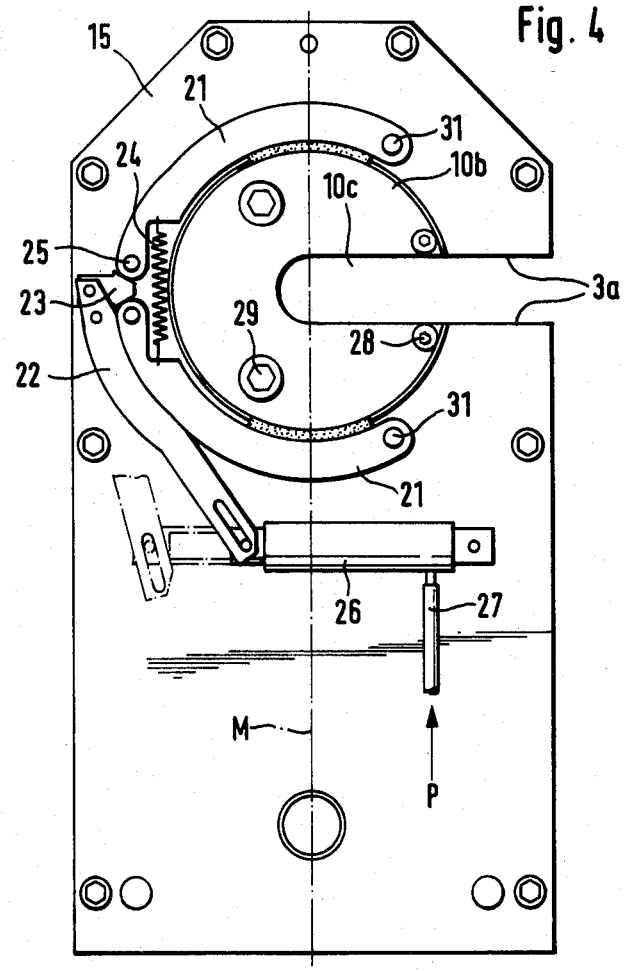
FIG. 4 illustrates the rotating and positioning tool with the housing cover in place as viewed from the position I in FIG. 2.
Figure 5:
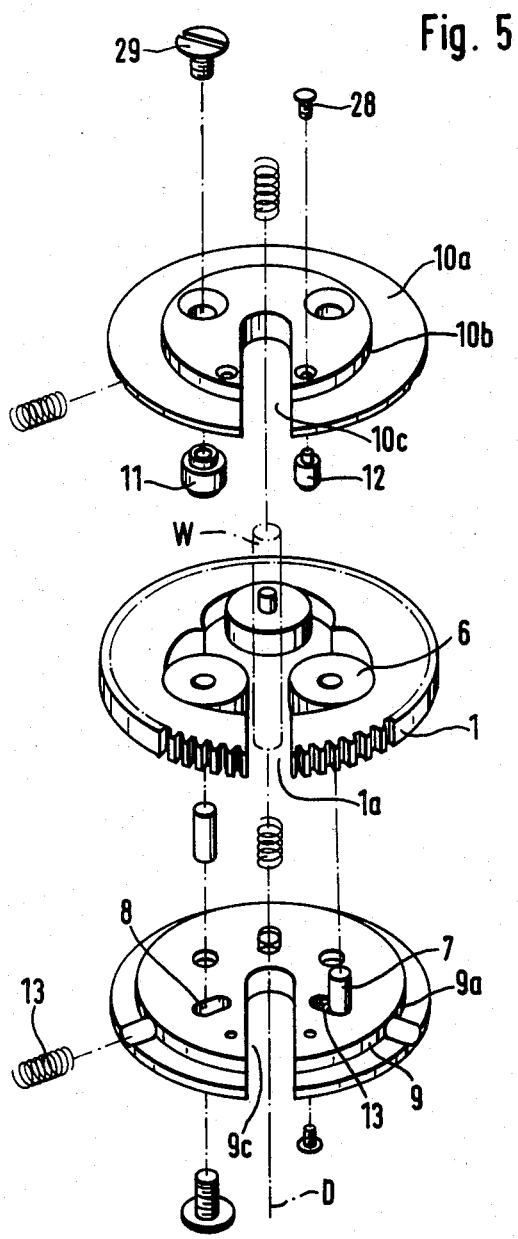
FIG. 5 is an exploded view of the crown gear and bearing disks of FIGS. 1-4.

The mechanism that brakes bearing disks 9 and 10 is illustrated in FIG. 4. Since it is positioned on the outside of housing cover 15, it has been left out of FIG. 2 for the sake of clarity.

Bearing disk 10 has another fixed appendage 10b on the outside. The diameter of appendage 10b is shorter than that of bearing disk 10. Appendage 10b extends out through an aperture in cover 15. The braking mechanism engages the circumference of the appendage as illustrated in FIG. 4. The braking mechanism, which is a shoed brake, has two brake shoes 21 that pivot around axes 31 and are forced against the circumference of appendage 10b by a tension spring 24 that is positioned between them. Rollers 25 are mounted on the free end of brake shoes 21 with a wedge 23 that rests against the end of a brake handle 22 and that can be activated by a pneumatic cylinder 26 mounted between them. Pneumatic cylinder 26 is supplied with compressed air over a line 27. Activating pneumatic cylinder 26 forces wedge 23 between rollers 25 and releases the braking mechanism. Bearing disks 9 and 10 are kept stationary or entrained by crown gear 1 over tension rollers 6 in accordance with how tight or loose the braking mechanism is during one rotation of crown gear 1. Bearing disks 9 and 10 can be rotated against the brake first of all subsequent to the aforesaid application of tension rollers 6 to a workpiece W. The requisite braking moment is small and loads the drive mechanism only slightly. The brake can be released as soon as tension rollers 6 rest tightly against workpiece W. This prevents release of the clamping action, which does not cease until crown gear 1 is rotated in the opposite direction. Compression springs 13, which force tension rollers 6 outward, automatically restore bearing disks 9 and 10 to their initial position in relation to crown gear 1.

Once a workpiece W has been securely clamped by tension rollers 6, it can, with the braking mechanism released, be rotated as desired around angles that are a multiple of 360° and accordingly positioned.

If the rotation of workpiece W is reversed, the braking mechanism will be activated and the direction of operations reversed. This produces a brief release of the clamping action and renewed tension in the opposite direction.

The tool can be removed or suspended from workpiece W only in the position in which the access slot 1a in crown gear 1, the entry slots 9c and 10c in bearing disks 9 and 10, and the recess 3a in housing 3 are all parallel. Once, therefore, workpiece W has arrived in a desired final position, the clamping action can be released by reversing the direction of rotation without activating the brake in so doing. Thus, the clamping action is not reestablished. Crown gear 1 is then rotated along with bearing disks 9 and 10 until the aforesaid slots are in the same position.

When crown gear 1 is motor-powered through drive cogwheels 4c, 5, 4a, and 4b, appropriate sensors can be provided to release signals that control the motor in such a way that the tool can be brought into the open position and kept there. Appropriate sensors include Hall generators and permanent magnets. The magnets can be positioned in a way that is not illustrated at the circumference of crown gear 1. The interruption in the sequence of teeth on crown gear 1 that will be necessary for this purpose will not affect its function because it is driven at two points. It is only necessary to ensure that the magnet is not so far from the access slot 1a in crown gear 1 that the interruptions in the sequence of teeth at the access slot and at the magnet occur simultaneously in front of driving cogwheels 4a and 4b. The Hall generator that generates the signals should then be mounted at an appropriated point in the vicinity of crown gear 1.

FIG. 1 shows the opening-and-starting position of the tool in continuous lines and the clamping position in dot-and-dash lines.

What is claimed is:

1. A rotating and positioning tool for axially symmetrical workpieces, especially steering tie rods in motor vehicles, comprising a housing having a recess for inserting the workpiece, said housing containing a powered clamping mechanism adjustable to engage the outside of the workpiece, said clamping mechanism being rotatable around the longitudinal axis of the workpiece, said clamping mechanism comprising: a crown gear having two sides, teeth around its circumference and having an empty space inside it that communicates with the outside through an access slot; means mounting the crown gear for rotation in the housing about an axis of rotation including a ring of ball bearings around the circumference of the crown gear; wherein the empty space is around the axis of rotation and is demarcated by a contour that varies between a maximum and a minimum distance from the axis of rotation during one rotation of said crown gear and includes three segments distributed around the contour at angular distances of 120° and which have the same maximum distance from the axis of rotation and between the segments the distance of the contour to the axis of rotation decreases continuously to the minimum; means for driving the crown gear comprising a cogwheel drive mechanism engaging the crown gear teeth at two angular displaced points; three tension rollers distributed in the empty space of the crown gear at angles of 120° and rotatably mounted on pivots which are parallel to the axis of rotation of the crown gear; two bearing disks disposed at the two sides of the crown gear; means mounting the bearing disks for rotation in the housing coaxial with the crown gear relative to the crown gear and the housing while not relative to each other, comprising a ring of ball bearings engaging the peripheries of the bearing disks and spacer means extending through the empty space and interconnecting the bearing disks; wherein each bearing disk has an entry slot extending from the periphery to the axis of rotation and has three slots therein angularly spaced at 120° and extending radially with respect to the axis of rotation of the crown gear and wherein the pivots of the tension rollers are slidably received in the slots and compression springs in the slots biasing the pivots radially outwardly to force the tension rollers into contact with the contour; a releasable brake for engaging at least one of the bearing disks.

2. A tool according to claim 1, wherein one of said bearing disks has an apendage on its circumference engaged by said brake.

3. A tool according to claim 2, wherein said brake comprises two pivoting brake shoes that engage the circumference of said appendage, said brake shoes each connected to a spring which forces said brake shoe against said appendage, said brake shoes having free ends which are simultaneously engaged by a wedge, said wedge disposed on an end of a brake handle and said brake handle connected to a pneumatic cylinder.

* * * * *